United States Patent Office 2,712,927
Patented July 12, 1955

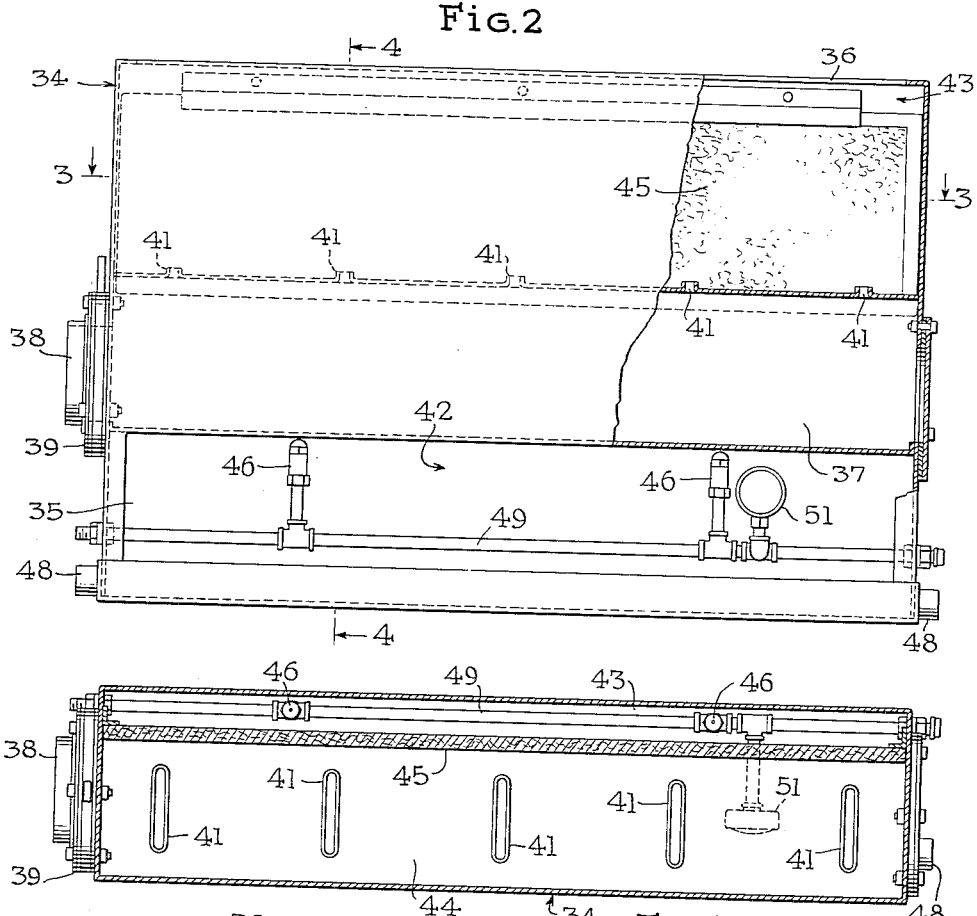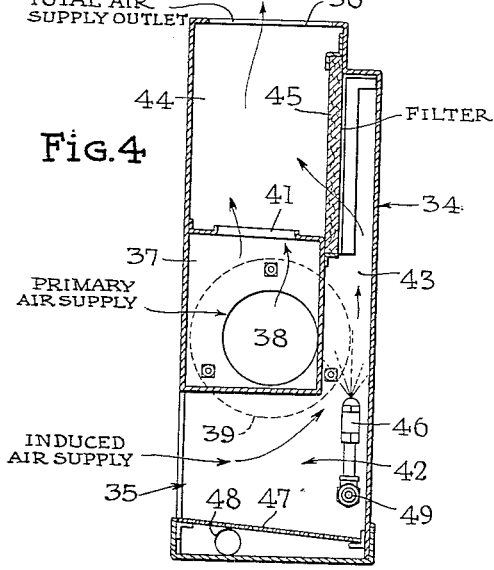

2,712,927

AIR CONDITIONING METHODS

Robert D. Blum, York, Pa., assignor to York Corporation, York, Pa., a corporation of Delaware Application November 25, 1949, Serial No. 129,433

5 Claims. (Cl. 261—11)

This invention relates to air conditioning, and affords a method usable under summer, winter and between-seasons conditions, to condition spaces where the load in summer is characterized by a low ratio of total heat to sensible heat. In such cases the portion of the cooling load attributable to latent heat is moderate. The system is thus adaptable to hotel rooms, apartment houses, office rooms and the like, and affords a number of important advantages over prior art systems, when so used.

In the early days of air conditioning, engineers thought in terms of theaters, auditoriums, and other high occupancy spaces, requiring the circulation of large volumes of conditioned air. Standards so developed have persisted in the treatment of spaces which, on analysis, present a far simpler problem. As a consequence, systems have been installed with needlessly large supply ducts and with return ducts which could be reduced in size, or even be eliminated.

According to the invention, the quantity of air supplied to a room is that necessary for ventilation, or slightly more, and is supplied under considerable pressure and in a highly conditioned state, which under summer operation means saturated at a low temperature, say about 45° F., that being a temperature at which in summer a satisfactory flow rate may be used. One criterion for a satisfactory flow rate is the possibility of using the same rate in winter with air heated to a practicable temperature. These two limiting conditions are met, and the same flow rate is used at all seasons. This obviously is a consideration of great practical importance. The air so supplied will hereinafter be called "primary air."

A controlled stream of cooled and dehumidified primary air (which may be all outside air or a mixture of outside and return air) and a proportioned stream of room air which may be called "secondary air" flow through a unit located in the room. The two streams mix as they discharge into the room and serve as the necessary "supply air." As the secondary or room air passes through the unit and prior to mixture with the primary air, the secondary air is adiabatically cooled by spraying water into it. This water is near to and preferably not above the desired room wet bulb temperature. The heat for vaporizing the water is derived from the room air, and consequently part of the heat in the room air is rendered latent, i. e. it is still present as latent heat of vaporization of the water vapor which is added to the air but the temperature in the space has been reduced. It is practicable in this way to deliver supply air of the desired dry bulb and wet bulb temperatures and at the desired rate. The total heat in the room air remains unchanged since the evaporation of water simply converts part of the internal room load from sensible to latent heat, but this mode of operating makes it possible to supply less primary air per internal sensible ton of refrigerative load than is required by conventional prior art systems.

The fact that the sprays are directed into the secondary air prior to mixture with the primary air is important, because the secondary air then has the maximum available heat. This ensures the best available thermodynamic reaction, and is one of the factors contributing to the remarkably satisfactory performance of the system.

A system of this type is not suited for use in conditioning theatres, auditoriums or other spaces in which the occupancy rate is high with a resultant high ratio of total heat to sensible heat. Where this ratio is low, however, the invention offers distinct advantages in cost of installation, space occupied by duct work, and availability of a single system for winter, summer and between seasons operation.

Another important advantage of the system is the fact that the spray water may carry non-volatile deodorizing or bactericidal chemicals (or both) without interference with its thermodynamic performance. This affords local treatment of the secondary air. The primary air also may be treated in the primary conditioning unit in any of the ways known in the art. As a consequence, the highest performance is attainable.

Another characteristic of great commercial importance stems from the fact that the primary air, which in summer is assisted by the sprays to assure the total effective cooling, can serve in winter as the heating and ventilating medium. In winter the sprays in the room units are shut down, except to the extent desired for chemical treatment of the secondary air and for humidification. This simplifies the room units, because no local heat source is needed. As a consequence the operation and maintenance of radiators in the room or in the units are not required.

In spring and fall when the requirements for heating and cooling are apt to reverse unpredictably, the system offers a new and unique advantage. The primary air is then supplied at a temperature which will offer a mild heating effect. Under such conditions, the spray may be operated to convert the heating effect normally offered by the primary air alone into a mild cooling effect. The system thus offers satisfactory control under wavering conditions which most prior art systems make no attempt to control since they lack the characteristic of gradual transition between a low heating effect and a low cooling effect which is afforded by the present invention.

A simple automatic control system, making use of conventional apparatus, can be used to control the conditioner under winter, summer or between-seasons conditions, but that can best be explained after the conditioning system has been described.

The term "winter conditions" will be used to indicate conditions requiring heating, and the term "summer conditions" to define those requiring cooling. The term "between seasons" will be used to define those transition periods which may occur at any time in certain climates and in northern climates occur most frequently in the spring and fall.

Referring to the accompanying drawings, in which:

Fig. 2 is a front elevation of a room unit, shown without any decorative casing and with parts broken away to reveal details of internal construction.

Fig. 3 is a horizontal section on the line 3—3 of Fig. 2.

Fig. 4 is a vertical section on the line 4—4 of Fig. 2.

Fig. 5 is a view of the primary air damper.

Figure 1:
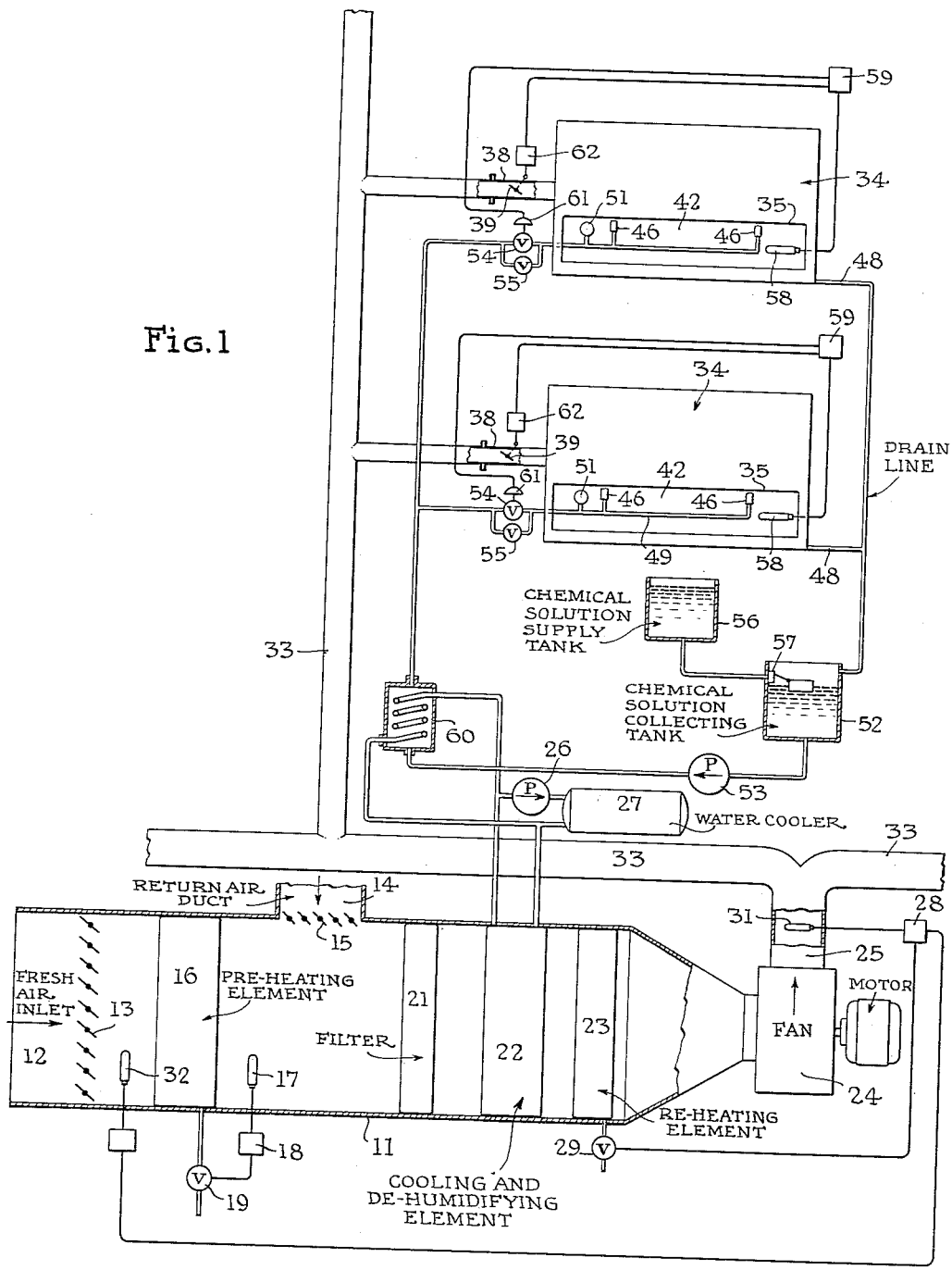
Fig. 1 is a diagram showing the unit for conditioning the primary air and delivering it to the room units, only two of which are shown.

Please refer first to Fig. 1.

For each building, or for each section, or zone of a building, as circumstances may make advisable, there is provided apparatus for conditioning primary air, and this furnishes primary air to a plurality of related room units, only two of which are shown in Fig. 1 since the various room units are substantially duplicates.

A duct 11 has a fresh air inlet 12 controlled by manually adjustable louvers 13. If return air ducts are used in the building (and commonly they will not be used with systems according to the present invention) there is a return air inlet 14 to which the return ducts lead. The inlet 14 is controlled by manually adjustable louvers 15. Closing louvers 15 in effect eliminates the return duct and hence the drawing can be deemed to show either of the two suggested arrangements.

Beyond inlet 12 and ahead of inlet 14 is a preheater 16 of any suitable type (for example a steam radiator) controlled by thermostat 17, relay 18 and valve 19 so that air is preheated to, say 45°. The preheater is operated in winter, is shut down in summer and may be operated between-seasons if considered desirable.

Beyond inlet 14 are a filter 21, a cooler 22 and a reheater 23 (for example, a steam radiator). Air is circulated through duct 11 by a constantly running, motor-driven fan 24 which delivers to a distributing duct 25 under a pressure head which is rather high but not above 12 inches of water, and at velocities which desirably may be as high as 12,000 feet per minute. The location of fan 24 beyond units 22 and 23 is a matter of choice. Any arrangement by which the fan will cause the air to flow through first one and then the other of these units, will serve.

I prefer to construct unit 22 as a large water-cooled surface heat exchanger because the controls can then be simple. Assuming that in summer 45° F. primary air is desired the water is cooled to and maintained at a uniform temperature of 40° F. Regardless of the demand for air and the entrance temperature of the air, such a cooler, if adequate in size, will discharge air close to 45° and never below 40°. Thus the drawing shows a circulating pump 26 and a water cooler 27 adequate to hold the water at a fixed temperature, here assumed to be 40° F. Such coolers are common in the refrigeration art. Unit 22 is operated only under summer conditions. Any arrangement that will cool to the desired temperature with reasonable uniformity may be used.

Reheater 23 is controlled by a thermostat of the reset type, well known in the temperature control art. The relay 28 controls valve 29 in response to the indications of primary thermostat bulb 31, modified by the indications of readjusting bulb 32, an outdoor bulb shown as located in the fresh air inlet 12. Both bulbs 31 and 32 respond to dry bulb temperature. They function only under winter and between-season conditions, for at other times reheater 23 is shut down. They can be arranged to afford almost any required pattern of temperature in duct 25 in relation to outdoor temperature.

The optimum temperature pattern depends on climate factors. Control principles well known in the heating art can be followed since unit 23 is basically a heating instrumentality. Elaborate description is deemed unnecessary beyond saying that low outdoor temperatures engender high discharge temperatures, the latter falling to a low value for heating, when outdoor temperature rises to 55° F. which is deemed to be a satisfactory change over point to the between-season setting.

To recapitulate, the primary unit delivers continuously air under considerable pressure and at high velocity. In summer the air is saturated at about 45° F. In winter and between seasons it is heated to temperatures which are varied in an inverse relation to outdoor temperature, and are moderate when outdoor temperatures reach and are in the between-seasons range. The drawings show one convenient way to secure the result but other arrangements which will attain the same end may be substituted.

The discharge 25 leads to branching ducts 33 which lead to units, one or more of which are mounted in each room to be conditioned. It is preferred to mount these units beneath windows. They may be enclosed in decorative casings having entrance and exit grilles, but these details would only confuse the drawings and consequently have been omitted. These units are indicated generally at 34, 34 in Fig. 1 and are illustrated in greater detail in Figs. 2, 3, and 4.

Each unit 34 comprises a generally rectangular housing closed on all sides except for an induced air (secondary air) inlet 35 at the front near the floor and a discharge aperture 36 through the top. Extending lengthwise within the housing at about mid-height and enclosed by partitions is a chamber 37 to which the primary air connection 38 leads through a damper 39, preferably of the iris diaphragm type, so that at all stages of opening it delivers air in a cylindrical stream to the chamber 37. This chamber functions both as a sound trap and as a supply manifold for the slot-like upward-directed nozzles 41 which discharge primary air in jets upward through the discharge aperture 36.

The inlet 35 leads to a chamber 42 in the bottom of the housing and beneath chamber 37. A passage 43 leads upward behind chamber 37 and discharges into the chamber 44 above chamber 37 and beneath discharge opening 36. It will be observed that each of the chambers 37, 42 and 44 and the passage 43, extends the full length of the housing of the unit. An air filter 45 extends the full length of the unit between the top wall of chamber 37 and an upper portion of the rear wall of the unit housing and so must be traversed by air flowing from passage 43 into chamber 44. The filter is removable for servicing or renewal, and besides its filtering function, is effective as a moisture eliminator.

A moderate excess of water is sprayed and some water droplets entrained by the air deposit on the filter where some adiabatic cooling occurs. For this reason a filter of glass fibers or other non-absorptive fibers is preferred. Some of the spray falls to the bottom of the unit where a screen 47 and drain connection 48 are provided to carry it off. The atomizers 46 are fed by a manifold connection 49. A gauge 51 is applied to manifold 49 and indicates the water pressure therein.

The use of primary air jets to induce circulation of the secondary air, and mixture of primary and secondary air to form the supply air stream is desirable because it favors quiet operation, reduces servicing requirements local to the unit nearly to the vanishing point, and reduces first cost. Other ways of circulating the secondary air could be used without impairing the thermodynamic performance and this fact is fully appreciated.

So far as the thermodynamic aspects of the system are concerned the atomizers 46 can deliver pure water. However, it is possible to secure bactericidal, fungicidal or deodorizing effects or combinations thereof by charging the water with suitable non-volatile chemicals, which precipitate from the spray, either in their original form or as reaction products. These are commonly active oxidizing agents, and they are not carried beyond filter 45, which as stated serves as an eliminator.

Fig. 1 shows a simple way in which the chemical solution may be fed and maintained. A collecting tank 52 delivers to pump 53 which supplies manifolds 49 with solution under pressure through regulating valves 54, each by-passed by a manually set valve 55 adjustable to afford any desired constant minimum flow. The drain connections 48 feed the excess solution back to tank 52. A supply tank 56 and float valve 57 provide for make up. The chemical feeding details could be elaborated but since they are not a feature of the present invention, only bare essentials are illustrated.

It is desirable that the sprayed liquid (whether this is water or a chemical solution) be delivered to the sprays at a uniform temperature, not higher, and desirably a few degrees lower, than the desired room wet bulb temperature. A simple arrangement is to pass the spray liquid through a heat exchanger 60 through which a part of the water from cooler 27 is circulated by pump 26. Other temperature controlling schemes will readily suggest themselves. The important thing is to limit the temperature of the spray liquid. The means for doing so can be variously contrived.

Each unit is controlled by a thermostat 58 subject to room temperature and illustrated in Fig. 1 as located in chamber 42. This thermostat operates through a relay 59 of the reversible type, which may be set by known means for summer and between-seasons operation or for winter operation. According to the well known Johnson Service Company practice the relays would be of the pneumatic type and would be set for two different operative characteristics by changing the pressure at which motive air is supplied to them.

Typical patents are:

Otto, 2,069,418, February 2, 1937
Otto, 2,207,941, July 16, 1940
Otto, 2,243,647, May 27, 1941
Scharpf, 2,272,025, February 3, 1942

Various other systems for changing the setting and operating characteristics of a plurality of room thermostats from a single control point are known, and any of several can be adopted. Indeed, the thermostats could be each manually reversed so far as the present invention is concerned. Hence, the change over control is not illustrated. The desirability of a unitary control and the availability of such controls are fully appreciated.

So far as is here material, thermostat 58 operates through relay 59 to effect two types of control of motor 61 which actuates water control valve 54 and motor 62 which actuates primary air damper 39, as follows:

*Summer and between seasons.*—In response to falling room temperature the thermostat first gradually closes water valve 54 and then gradually closes air valve 39.

*Winter.*—Maintains water valve 54 closed and opens air valve 39 in response to falling temperature. Valve 55 is set to provide water for humidification. This could be automatically controlled by conventional means, but such control is not involved in the invention and hence is not illustrated.

Observe that between seasons the primary air provides a slight heating effect so long as the sprays are off. When the sprays are operating their evaporative refrigerating effect will predominate.

OPERATION

*General considerations.*—Fan 24 runs continuously, and fresh air or a mixture of return air and fresh air is properly conditioned and delivered under pressure to the duct system 33. This air is fed to the nozzles 41 in the various room units under the control of dampers 39. The air discharging from the nozzles 41 induces flow of room air (secondary air) through the entrance opening 35 and chamber 42 past the spray nozzles 46 to and through the filter 45.

This air entering the chamber 44 mixes with the primary air discharged from the nozzles and mixture is discharged into the room. This operation takes place at all seasons. However, the spray nozzles 46 are shut down under winter conditions except to the extent that the by-pass valve 55 furnishes liquid for humidification or for chemical treatment of the air or for both. The evaporative cooling performed by the by-passed liquid is negligible.

*Winter conditions.*—Under winter conditions the preheater 16 and the reheater 23 are operated and the cooling and dehumidifying element 22 is shut down. Under thermostatic control the system furnishes to the duct 33 air whose temperature varies in an inverse relation to outdoor temperature and this primary air is fed to the room unit 34 under control of the dampers 39 in such a way that the flow of air is increased in response to falling room temperature. Thus, the primary air is the heating medium delivered to the room.

*Summer conditions.*—Under summer conditions the preheater 16 and the reheater 23 are shut down and the cooling and dehumidifying unit 22 is in operation. As above explained the system furnishes air at a substantially constant temperature of the order of 45° F. This air is delivered as primary air to the units 34, and discharging from the nozzles 41 induces the flow of secondary air from and back to the room just as such flow is induced under winter conditions. At this time each room thermostat 58 controls the related damper 39 and water valve 54 in such a way that on falling temperature the thermostat first gradually closes the water valve and then gradually throttles the primary air flow at damper 39. It follows that the sprays are used only when the cooling load is significant. When it is not the primary air is relied upon for the major cooling effect.

*Between-seasons operation.*—In the between-seasons range the cooler 22 is shut down and the preheater 16 and reheater 23 are operating exactly as they do under winter conditions. With outside temperature in the between-seasons range, air is delivered to the duct system 33 at a very moderate temperature. The room thermostat is set for summer conditions. In the lower room temperature range the water valve will be closed by the thermostat and the thermostat will simply control the supply of primary air.

It is true that this control is the reverse of that which would normally be desired but the point is immaterial because at this time the heating effect is so slight that regulation of air flow is practically without effect. What happens is that on rising room temperature the control will turn on the sprays while the damper is wide open. The sprays then have the effect of overpowering the mild heating effect of the primary air so that there is a resultant overall cooling effect. The device thus simply shifts from an overall mild heating effect when the sprays do not operate to an overall mild cooling effect when they do. Practical experience with a full size pilot installation indicates that the control so effected is satisfactory under between-seasons conditions.

Under summer conditions primary air may be used at temperatures between 40° and 45° and at rates between 184 and 217 cu. ft. per minute with good effect. Under winter conditions at the same rates of flow the maximum temperatures would be between 146° and 135° F. The suggested limits are good commercial limits and not strictly critical. Within the limits stated it is possible to eliminate return ducts at the price of a very moderate penalty. The primary air does not require cooling to an unreasonable temperature in summer and similarly the primary air does not require heating to unreasonable temperature in winter. A conventional duct system would require the circulation of 535 cu. ft. per minute of primary air as against 217 cu. ft. for the first case and 184 cu. ft. for the second. Thus, the invention offers a tremendous saving in the space occupied by duct work. This is particularly true where return ducts are not used.

The methods, above described, have the advantage that the primary air carries all the heating load under winter conditions and a significant part of the internal sensible cooling load under summer conditions. The use of the flow inducing injector mechanism and the location of spray heads in the path of the induced air before its mixture with the primary air permit the construction of a room unit which is acceptable not only from the technical standpoint but also from the standpoint of appearance and from the standpoint of maintenance. There are no radiators and no radiator pipe. The only thing requiring periodic servicing is a replaceable filter. The interior of the unit itself should seldom require cleaning and is readily accessible for that purpose.

As a consequence the method offers in addition to its unique thermodynamic characteristics, and its use of ducts of small cross-section, a number of features whose value becomes apparent only when the problem of maintenance is encountered. Its adaptability to the inclusion of chemical treatment of the secondary air is an advantage which can be availed of or omitted at the preference of the user.

I claim:

1. A method of conditioning the air in a room in summer which consists in conditioning primary air in quantity sufficient for ventilation of the room and so that the air is substantially saturated and at a temperature between 40° and 45° F.; delivering said air into the room; causing room air to circulate and to mix with the primary air adjacent the point of entrance of the latter; and supplementing the cooling effect of the primary air by atomizing water in and thus adiabatically cooling the circulating room air at a point in its circulatory path near to but in advance of its arrival at said point of entrance.

2. The method of conditioning the air in a room in summer which consists in conditioning primary air in quantity sufficient for ventilation of the room and so that the air is substantially saturated at a temperature between 40° and 45° F.; delivering said air into the room; causing room air to circulate and to mix with the primary air adjacent the point of entrance of the latter; supplementing the cooling effect of the primary air by atomizing water in and thus adiabatically cooling the circulating room air at a point in its circulatory path near to but in advance of its arrival at said point of entrance; and controlling the resulting room conditions according to room temperature by gradually reducing the quantity of water atomized, and when the quantity of water atomized approaches zero gradually reducing the flow of primary air each to oppose a fall in room temperature.

3. The method of conditioning air in a room under between-seasons conditions which consists in supplying heat to the room by delivering thereto a stream of relatively dry air at a temperature and in quantity slightly more than sufficient to sustain the desired room temperature, causing room air to circulate toward and mix with said stream, and when room temperature is above said desired value rendering a portion of the heat of the mixed stream latent by spraying water into the approaching room air at a temperature approximating the desired room wet-bulb temperature and in quantity sufficient to produce an adiabatic cooling effect but insufficient to saturate the air in said mixed stream.

4. The method of conditioning air in a room under between-seasons conditions which consists in continuously inducing circulatory flow of air in the room by jet action of a stream of air flowing into the room at a temperature at least as high as the desired room temperature, and when room temperature is above said desired temperature spraying water into the circulating room air at points shortly in advance of the point where it is propelled by said jet action and at a temperature approximating the desired wet-bulb temperature, whereby adiabatic cooling is afforded.

5. An air-conditioning method for an enclosed space comprising producing a continuous high-velocity stream of primary air; controlling the heat content of said primary air with relation to seasonal changes of out of doors temperature so that when said temperature is in a range upward from a chosen temperature which is slightly higher than the human comfort temperature the primary air is saturated at a substantially uniform temperature between 40° and 45° F., and when out of doors temperature falls in a range downward from said chosen temperature the primary air temperature increases above said substantially uniform temperature at rates related to the fall of out of doors temperature; delivering said primary air continuously to the space to be conditioned; causing circulation of air in said space and mixture of said space air with the primary air; in each of said ranges controlling the rate of delivery of primary air to said space in relation to space temperature so as to maintain space temperature approximately uniform; and in portions of both ranges which extend above and below said chosen temperature, spraying water into the circulating air near the point of its mixture with the primary air, the water so sprayed in said upward range being at a temperature approximating the wet-bulb temperature desired for said space.

References Cited in the file of this patent

UNITED STATES PATENTS

| Number | Name | Date |
|---|---|---|
| 1,935,305 | West | Nov. 14, 1933 |
| 1,955,406 | Carrier | Apr. 17, 1934 |
| 1,995,667 | Cano | Mar. 26, 1935 |
| 2,144,626 | Hewitt | Jan. 24, 1939 |
| 2,159,276 | Lawless | May 23, 1939 |
| 2,256,940 | Crawford | Sept. 23, 1941 |
| 2,342,689 | Pennington | Feb. 29, 1944 |